(12) United States Patent
Akiyama et al.

(10) Patent No.: US 8,730,540 B2
(45) Date of Patent: May 20, 2014

(54) SHEET TRANSPORT APPARATUS

(75) Inventors: Mamoru Akiyama, Yamanashi-ken (JP);
Seiji Nishizawa, Chuo (JP); Toshiya Sato, Otsuki (JP); Koji Kanda, Kai (JP);
Tetsuya Noda, Minamialps (JP);
Toshiyuki Ito, Nirasaki (JP)

(73) Assignee: Nisca Corporation, Minamikoma-gun, Yamanshi-ken (JP)

( * ) Notice: Subject to any disclaimer, the term of this patent is extended or adjusted under 35 U.S.C. 154(b) by 92 days.

(21) Appl. No.: 13/435,705

(22) Filed: Mar. 30, 2012

(65) Prior Publication Data
US 2012/0250114 A1    Oct. 4, 2012

(30) Foreign Application Priority Data

Apr. 4, 2011 (JP) .................................. 2011-082552

(51) Int. Cl.
    *H04N 1/04* (2006.01)
(52) U.S. Cl.
    USPC ........... 358/498; 358/497; 358/486; 399/367; 399/370; 271/264; 271/4.1
(58) Field of Classification Search
    CPC ........... H04N 1/04; H04N 1/12; H04N 1/191;
        H04N 1/93; H04N 1/00602; H04N 1/00745;
        H04N 1/00519; H04N 1/00567; H04N 1/0058;
            H04N 1/00588; H04N 1/00591; H04N
            1/00628; B65H 5/06; B65H 3/06; G03G
            21/20; G03G 15/10; G03G 2215/00316;
                                G03G 2215/00329

USPC .......... 358/498, 497, 486; 399/367, 370, 374,
        399/373, 264, 4.1, 145, 226, 410, 92, 21,
                    399/10.03, 116; 271/410, 92, 21
See application file for complete search history.

(56) References Cited

U.S. PATENT DOCUMENTS

| | | | | |
|---|---|---|---|---|
| 5,689,793 | A | * | 11/1997 | Kobayashi et al. ........... 399/374 |
| 5,819,152 | A | * | 10/1998 | Kobayashi et al. ........... 399/367 |
| 5,826,155 | A | * | 10/1998 | Kobayashi et al. ........... 399/367 |
| 5,903,811 | A | * | 5/1999 | Kobayashi et al. ........... 399/367 |
| 7,762,539 | B2 | * | 7/2010 | Nagata et al. ............... 270/58.08 |
| 8,256,757 | B2 | * | 9/2012 | Imazu et al. ..................... 270/32 |

FOREIGN PATENT DOCUMENTS

| | | |
|---|---|---|
| JP | 2003-063687 | 3/2003 |
| JP | 2003-095490 | 4/2003 |

* cited by examiner

*Primary Examiner* — Negussie Worku
(74) *Attorney, Agent, or Firm* — Manabu Kanesaka

(57) ABSTRACT

A sheet transport apparatus that transports a sheet to a reading section for reading the sheet, has a reading front roller pair contacting with a front end of the sheet to form a register loop in the sheet; a first transport path extending curvingly toward the reading front roller pair; a second transport path extending curvingly toward the reading front roller pair after joining the first transport path; a first register space in which a register loop is formed in a sheet guided along the first transport path; and a second register space in which a register loop is formed in a sheet guided along the second transport path. The first register space is provided on the upstream side of a junction position in which the first transport path joins the second transport path, and the second register space is provided on the downstream side of the junction position.

11 Claims, 8 Drawing Sheets

SHEET TRANSPORT APPARATUS

BACKGROUND OF THE INVENTION

1. Field of the Invention

The present invention relates to a sheet transport apparatus in which register spaces to correct skew of a sheet are provided in a sheet transport path.

2. Description of the Related Art

In an image formation apparatus such as a copier and printer and an image reading apparatus provided in a scanner, facsimile or the like, provided is a sheet transport apparatus which feeds an original (sheet) to each processing section such as a printing section and reading section, and discharges the sheet processed therein. Such a sheet transport apparatus is configured as a transport unit attachable to the image formation apparatus or image reading apparatus having a reading platen to read an image of the sheet.

In the sheet transport apparatus, a sheet transport path is curved in the shape of a U and extends so as to connect between a paper feed tray provided on the upper-stage side and a sheet discharge tray provided on the lower-stage side, and the reading section having the reading platen exists in the path therebetween. A plurality of transport rollers is disposed in the sheet transport path. These transport rollers are provided with a separate roller that separates a plurality of sheets mounted on the paper feed tray, register roller that corrects skew of a sheet, a pair of reading rollers arranged to sandwich the reading section, sheet discharge roller that transports the read sheet toward the sheet discharge tray, etc. A sheet transport apparatus for reading the frontside and backside of a sheet successively is provided with a reverse path and reverse roller that reverse a sheet with the frontside read and then transport the backside toward the reading section.

The sheet transport apparatus provided with the aforementioned reverse mechanism is comprised of a first transport path extending to the sheet discharge tray from the paper feed tray via the reading section to read the frontside of a sheet, and a second transport path for reversing the sheet with the frontside read and re-transporting the backside toward the reading section. Then, the second transport path joins the first transport path on the upstream side of the reading section.

Sheet transport apparatuses disclosed in Japanese Patent Application Publication No. 2003-63687 and Japanese Patent Application Publication No. 2003-95490 have a first register space in the first transport path extending from the paper feed tray to the register roller, and a second register space in the second transport path for transporting the sheet that is reversed via the reading section again toward the reading section. Further, first to third switching members are arranged to be swingable in portions in which the first transport path joins the second transport path in between the register roller and the transport roller, and a clearance to correct skew of the sheet is formed in between the guide surface of the switching member and the guide surface of the sheet transport path.

In the sheet transport apparatuses disclosed as described above, since the second register space to correct skew of the reversed sheet is in a position away on the upstream side of the register roller, there is the fear that skew of the sheet newly arises for a period during which the sheet reaches the reading section via the register roller. Further, since the sheet passing through the first transport path and the second transport path is transported while swinging the switching member, friction increases and sometimes interferes with transport of the sheet. Particularly, in sheets made of a thin material, there is the risk of causing a sheet jam. Therefore, it is necessary to adjust the clearance between the guide surface of the switching member and the guide surface of the transport path as appropriate, while setting the curvature of each guide surface accurately, and the apparatuses thus have the inconvenience in adjustment or setting.

Therefore, it is an object of the present invention to provide a sheet transport apparatus for correcting skew of a sheet in the upstream vicinity of the reading section and thereby enabling reading processing to be performed accurately and smoothly in any case of sheet frontside reading transport and backside reading transport.

SUMMARY OF THE INVENTION

A sheet transport apparatus of the invention is a sheet transport apparatus provided with a reading front roller pair, disposed in the upstream vicinity of a reading section that reads a sheet, coming into contact with a front end of the sheet to form a register loop in the sheet, a first transport path extending while being curved toward the reading front roller pair, and a second transport path extending while being curved toward the reading front roller pair after joining the first transport path on the upstream side of the reading front roller pair, and has a first register space in which a register loop is formed in a sheet guided along the first transport path, and a second register space in which a register loop is formed in a sheet guided along the second transport path, where the first register space is provided on the upstream side of a junction position in which the first transport path joins the second transport path, and the second register space is provided on the downstream side of the junction position.

By this means, the register loops of a sheet passing through the first transport path and the second transport path are formed in the first register space and the second register space provided on the upstream side and the downstream side of the position, respectively, in which the first transport path joins the second transport path in the upstream vicinity of the reading front roller pair, and it is thereby possible to correct skew of the sheet with similar accuracy immediately before the reading section both in reading the frontside of the sheet and reading the backside of the sheet.

DESCRIPTION OF THE PREFERRED EMBODIMENTS

Figure 1:
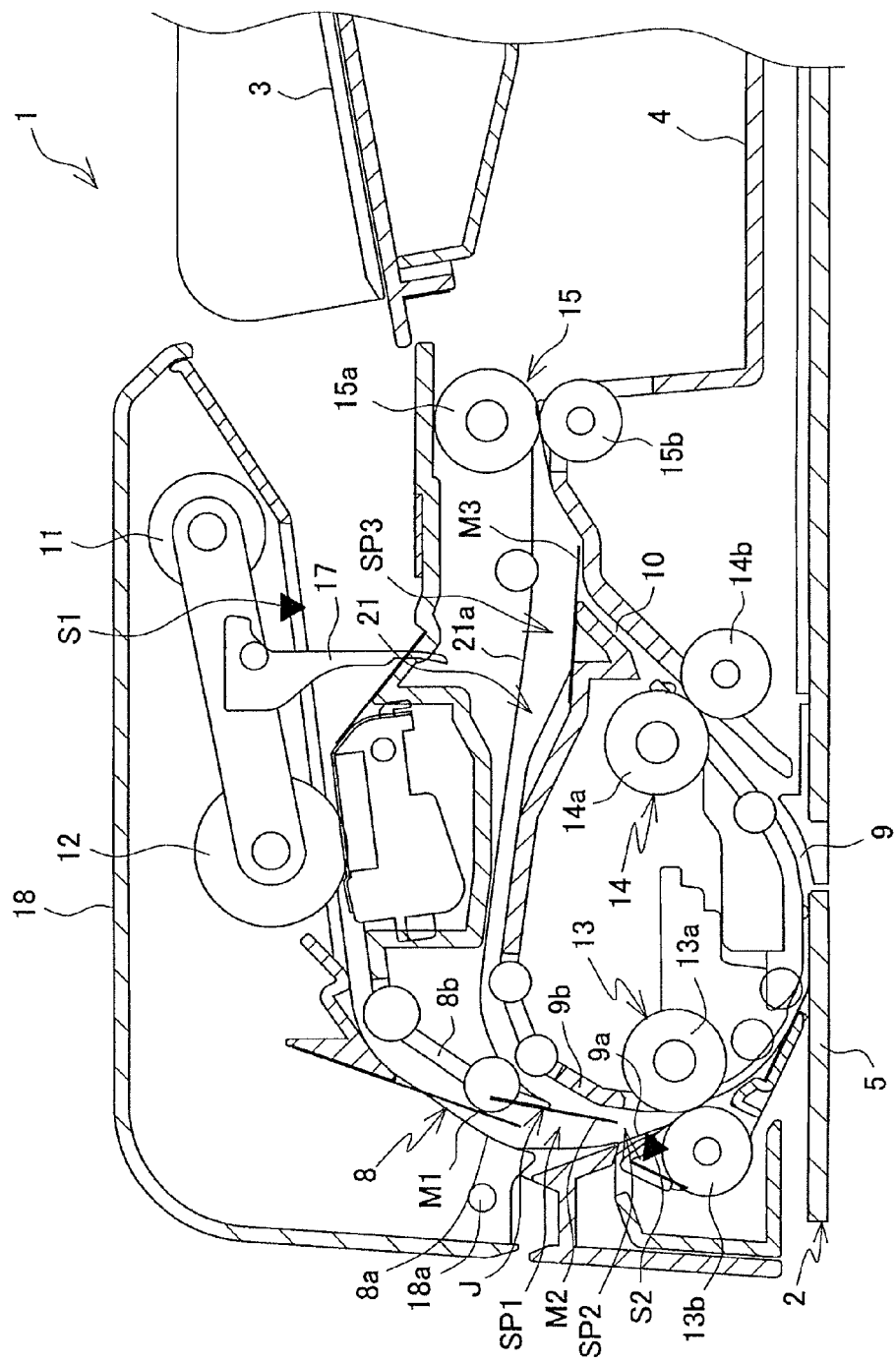
FIG. 1 is a sectional view of principal part of a sheet transport apparatus according to the invention.

Embodiments of a sheet transport apparatus according to the invention will specifically be described below with reference to drawings. As shown in FIG. 1, a sheet transport apparatus 1 has a transport path having a first transport path (paper feed path) 8 curved in the shape of a U extending from a paper feed tray 3 capable of mounting a plurality of sheets thereon to a sheet discharge path 4, and a second transport path (reverse path) 21 turned toward the paper feed path 8 from the front of the sheet discharge tray 4, and a plurality of transport roller pairs disposed on the transport path, and is thus configured.

The paper feed path 8 is a transport path to separate a plurality of sheets loaded on the paper feed tray 3 on a sheet-by-sheet basis to feed to the platen 5 side. Further, a reading path 9 extending from the paper feed path 8 via the platen 5 provided in a reading apparatus body 2 is continued to a sheet discharge path 10 continued to the sheet discharge tray 4 from the reading path 9. In addition, in the paper feed path 8, first and second guide members (first and second film members) M1, M2 are provided to guide transport of a sheet, and a curved portion curved toward the platen 5 is formed.

In the reading path 8, a space for transporting a sheet is formed by a first outside guide surface 8a, first inside guide surface 8b and third inside guide surface 21b of the reverse path 21. Meanwhile, in the reverse path 21, a space for transporting a sheet is formed by a third outside guide surface 21a and third inside guide surface 21b. The first outside guide surface 8a is provided in an open/close cover 18 supported rotatably by a rotation shaft 18a, and is capable of being opened by operating rotation in a counterclockwise direction viewed in the figure. In addition, the open/close cover 18 is provided with a pick-up roller 11 and paper feed roller 12, and rotates integrally.

The plurality of transport roller pairs is comprised of the pick-up roller 11 that picks up a sheet from the paper feed tray 3, a paper feed roller 12 that feeds the picked-up sheet to the paper feed path 8, a reading front roller pair 13 that aligns the sheet in front of the platen 5, a reading rear roller pair (register roller pair) 14 that transports the sheet along the reading path 9, and a reverse sheet discharge roller pair 15 to discharge the sheet to the sheet discharge tray 4 or switch back the sheet to the reverse path 21.

The pick-up roller 11 comes into contact with the top surface of a sheet mounted on the paper feed tray 3 with the sheet struck against an alignment plate 17 and aligned. In addition, the alignment plate 17 is configured to release the regulation on the sheet when the pick-up roller 11 picks up the sheet. The paper feed roller 12 separates the sheet(s) that is picked up by the pick-up roller 11 to a single sheet to feed toward the paper feed path 8 in cooperation with a separate member.

The reading front roller pair 13 is comprised of a driving roller 13a and driven roller 13b, the reading rear roller pair 14 is comprised of a driving roller 14a and driven roller 14, and the sheet discharge roller pair 15 is comprised of a driving roller 15a and driven roller 15b. In this Embodiment, the reading front roller pair 13 is disposed in a position close to the platen 5, and therefore, registers the sheet fed to the reading front roller pair 13, while transporting the sheet together with the reading rear roller pair 14 opposed with the platen 5 therebetween in reading of the sheet. In other words, the reading rear roller pair 14 functions also as the register roller pair. In addition, in the driving rollers 13a, 14a and 15a, a high-friction member is used in the rotation surface so as to prevent the sheet from slipping to stabilize feed action, and in the driven rollers 13b, 14b and 15b, a low-friction member is used in the rotation surface so as to facilitate a guide of the sheet.

Figure 2:
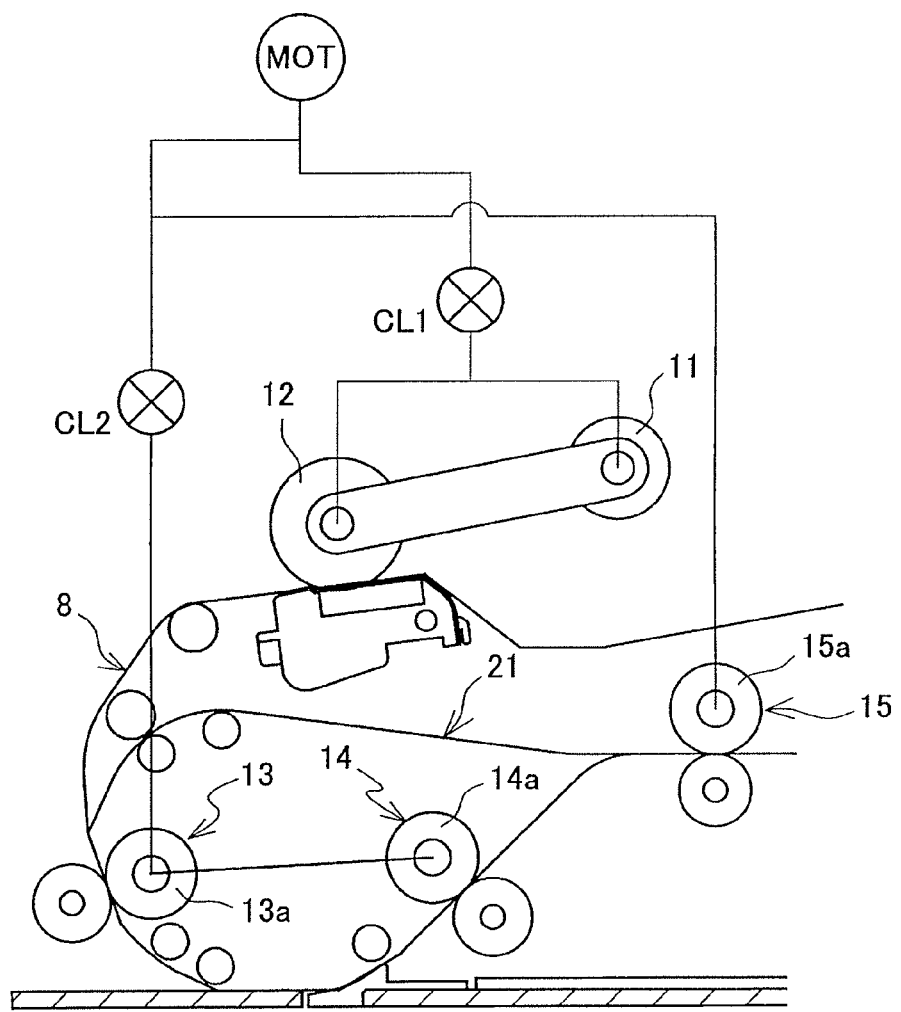
FIG. 2 is a driving system view of the sheet transport apparatus.
Figure 3:
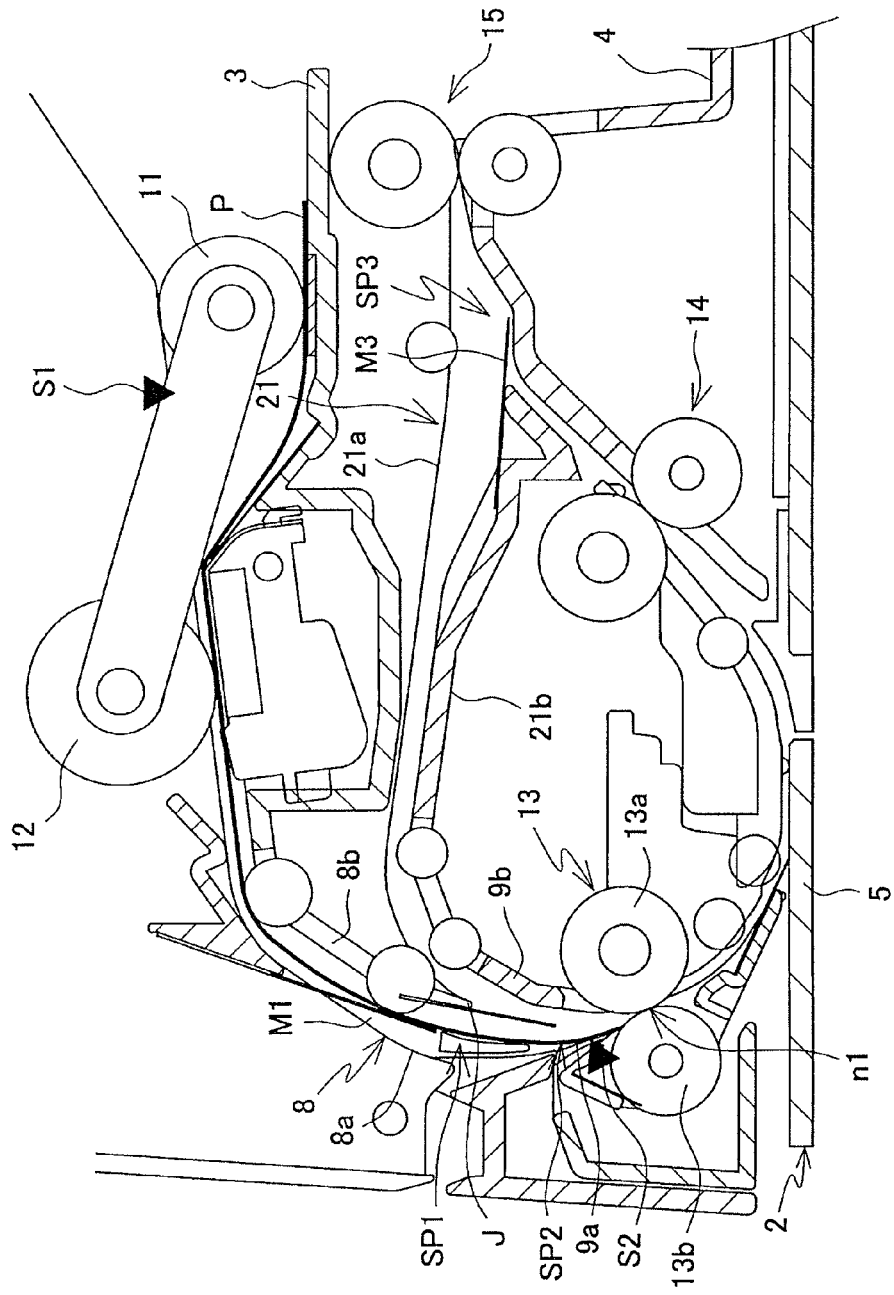
FIG. 3 is a sectional view showing paper feed action of the sheet transport apparatus.

Meanwhile, as a configuration of the control system, an empty sensor S1 is disposed to detect that sheets are mounted on the paper feed tray 3, and a register sensor S2 that detects the end portion of the fed sheet is disposed in front of the reading front roller pair 13 inside the paper feed path 8. Each of the sensors S1 and S2 is connected to a control section (not shown) provided with a CPU that controls the entire action of the sheet transport apparatus 1, and a driving motor MOT and first and second electromagnetic clutches CL1 and CL2 as shown in FIG. 2 are controlled based on a detection signal from each of the sensors S1 and S2.

The inside configuration of the paper feed path 8 will be described next. As shown in FIG. 1, the paper feed path 8 has a junction position (junction point) J in which the reverse path 21 extending from the reverse sheet discharge roller pair 15 is curved and joins, and in the vicinity of the junction point J, the clearance to guide the sheet is formed wider than the upstream side. The first film member M1 is provided from the upstream side of the junction point J as a starting point, and the front end portion extends to the vicinity of the junction point J. In other words, the first film member M1 is provided so that the point extended from the surface that guides the sheet crosses in the vicinity between the first outside guide surface 8a and the junction point J. Meanwhile, the second film member M2 is disposed from the junction point J as a starting point so that the front end portion is directed toward the reading front roller pair 13 on the downstream side. In other words, the second film member M2 is provided so that the point extended from the surface that guides the sheet is directed toward the periphery or the vicinity of the driven roller 13b of the reading front roller pair 13. Accordingly, one side surface of the second film member M2 is the inside guide of the paper feed path 8, the other surface side is the outside guide of the reverse path 21, and the front end of the sheet is smoothly led to the nip portion of the reading front roller pair 13 while coming into contact with the driven roller 13b formed of the low-friction resin. In addition, in the first film member M1, when thick sheets are registered, it is preferable to use the member made of a material, easy to bow, having flexibility so as to shift to the first outside guide surface 8a side due to toughness of the sheet. By this means, since it is possible to form a register loop with the large curvature, the front end of the sheet does not stick out from the nip portion n1 of the reading front roller pair 13 to the downstream side due to toughness of the sheet, and it is possible to register sheets with different thicknesses correctly.

Meanwhile, since the second film member M2 is of common guide surfaces to the sheet passing through the paper feed path 8 and the sheet passing through the reverse path 21, it is preferable to use a film material having rigidity with a smaller bow amount than the first film member M1. In addition, as descried previously, since the driven roller 13b of the reading front roller pair 13 is formed of the low-friction resin, it is possible to guide the sheet toward the periphery or the vicinity of the driven roller 13b by the second film member M2 so that the front end of the sheet is smoothly led to the nip portion n1 while coming into contact with the driven roller 13b.

In front of the first film members M1, M2 are formed a first register space SP1 having a wider sheet transport space than the upstream side of the paper feed path 8, and a second register space SP2 on the downstream side of the SP1. The first register space SP1 is formed so that the first outside guide surface 8a positioned on the front end side of the first film member M1 protrudes outward, and is provided in between the extension of the first film member M1 and the first outside guide surface 8a. Further, the second register space SP2 is formed so that the second outside guide surface 9a positioned on the front end side of the second film member M2 protrudes outward similarly, and is provided in between the extension of the second film member M2 and the second outside guide surface 9a.

Figure 4:
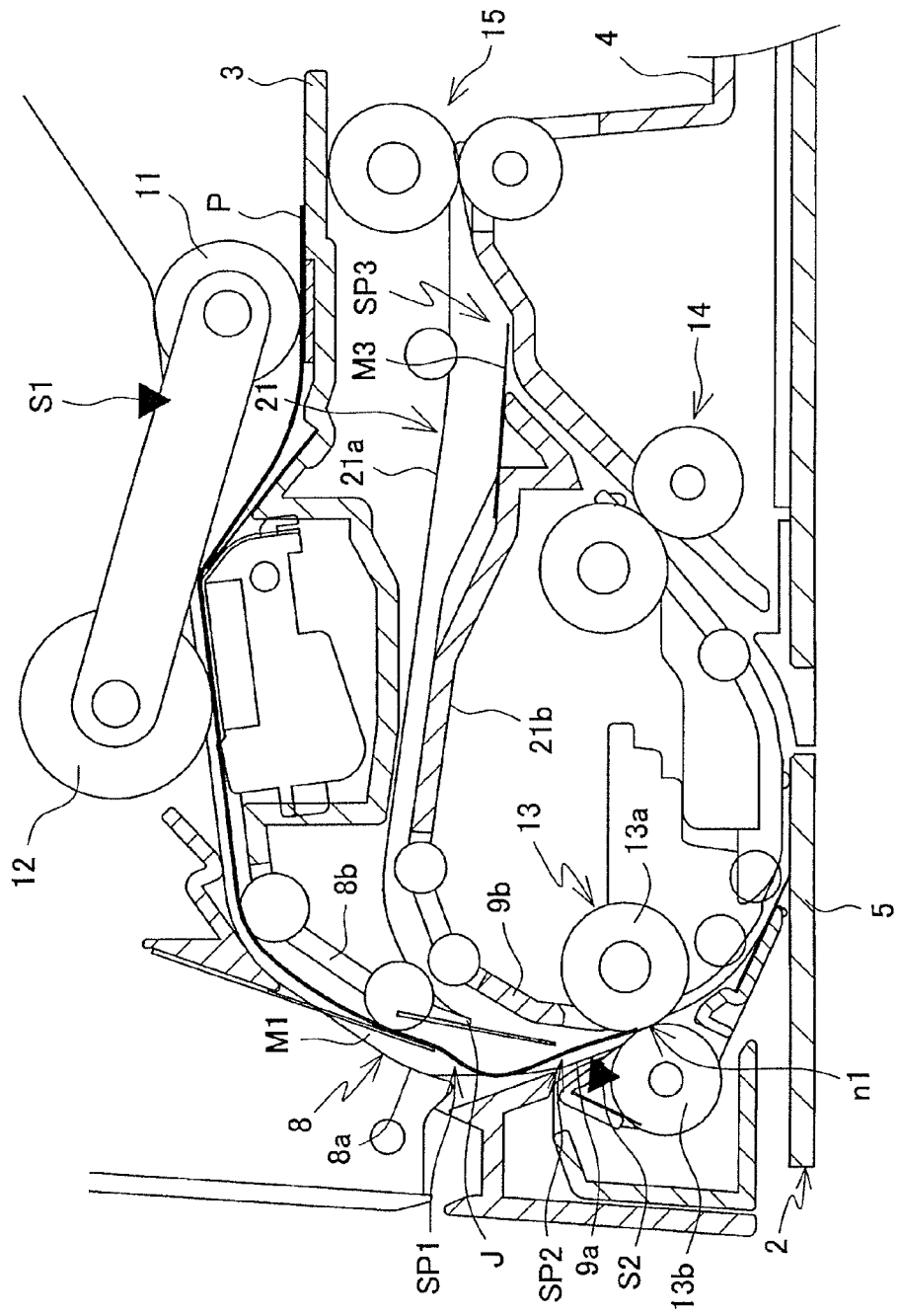
FIG. 4 is a sectional view showing first register action of the sheet transport apparatus.
Figure 5:
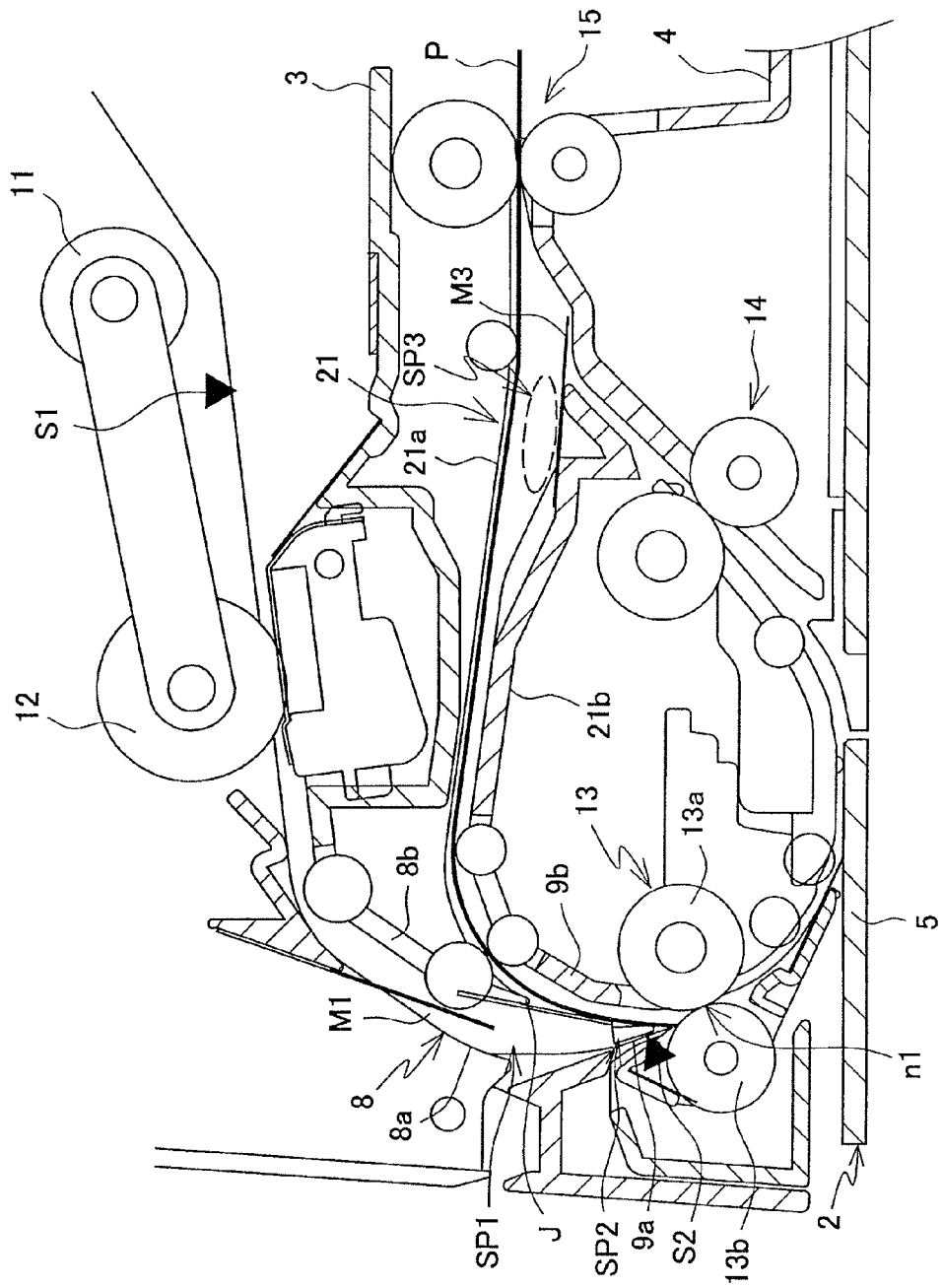
FIG. 5 is a sectional view showing reverse paper feed action of the sheet transport apparatus.
Figure 6:
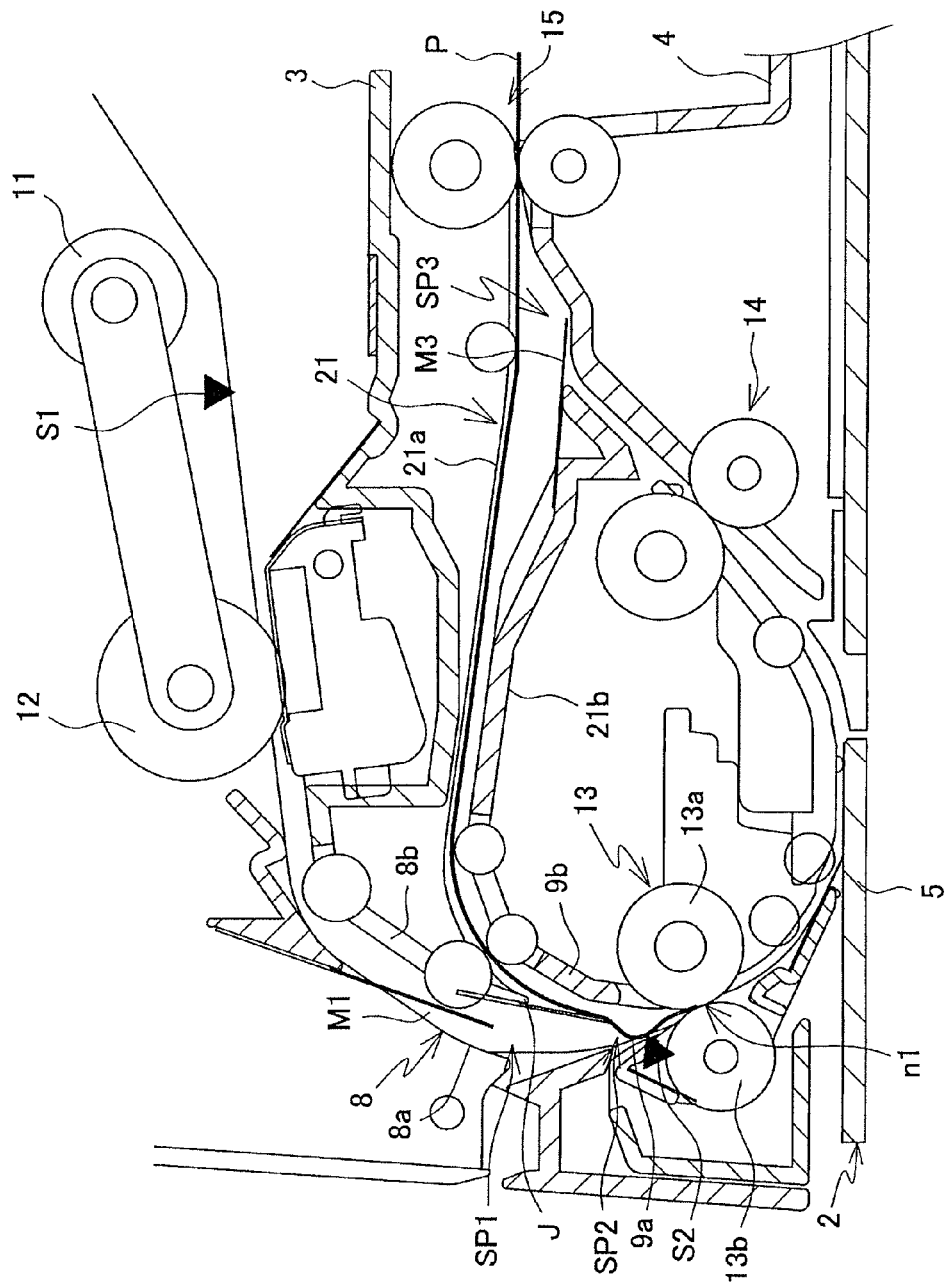
FIG. 6 is a sectional view showing second register action of the sheet transport apparatus.

In the first register space SP1, as shown in FIG. 4, the front end of the sheet fed from the paper feed tray 3 strikes the nip portion n1 of the reading front roller pair 13, the sheet becomes bow-deformed to follow the first outside guide surface 8a and causes a register loop, and skew of the sheet is thus corrected. In the second register space SP2, as shown in FIG. 6, the front end of the sheet re-transported from the reverse path 21 is guided by the second film member M2 to strike the nip portion n1 of the reading front roller pair 13, the sheet becomes bow-deformed to follow the second outside guide surface 9a and causes a register loop, and skew of the sheet is thus corrected.

Figure 7:
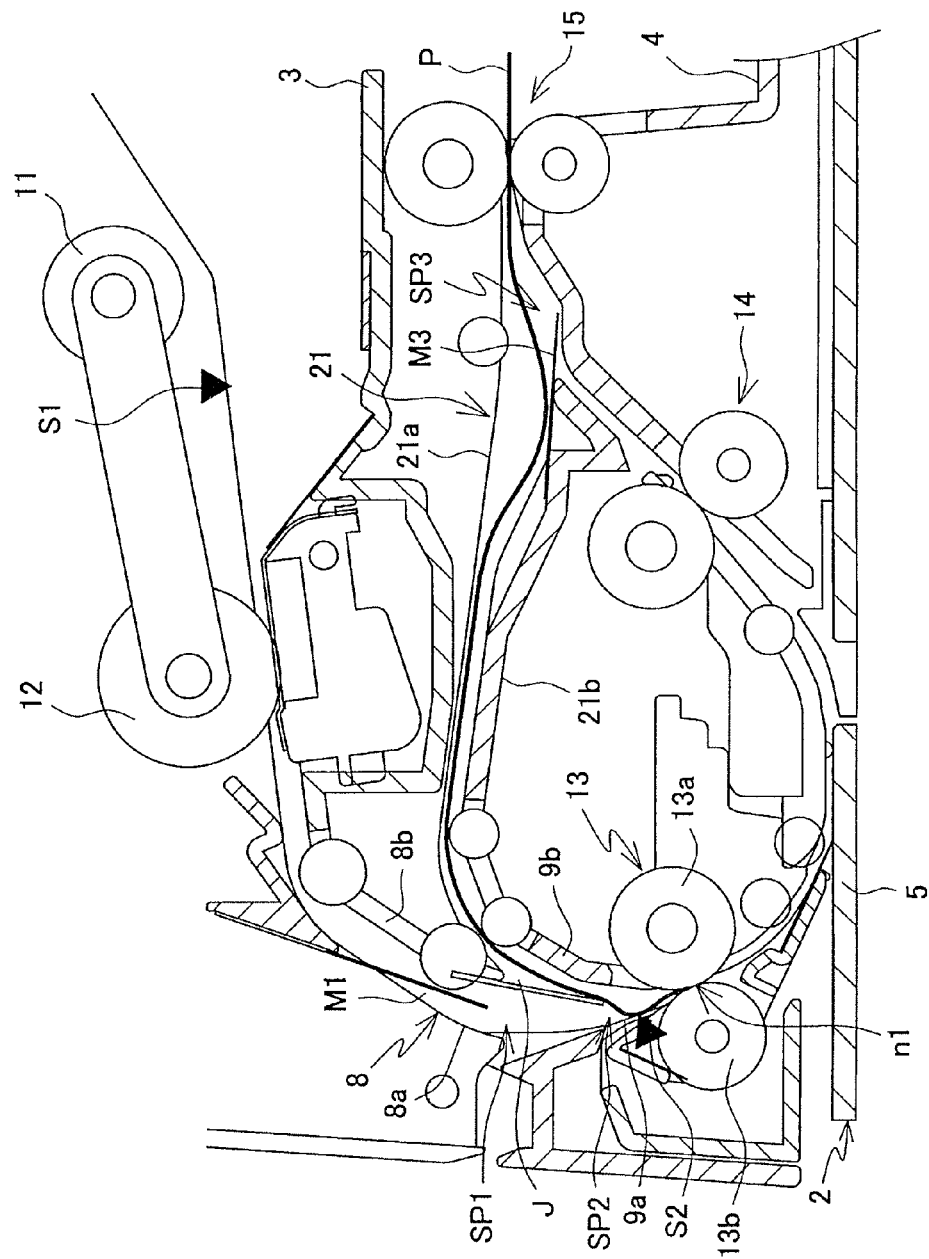
FIG. 7 is a sectional view showing third register action of the sheet transport apparatus.

In addition, as shown in FIG. 1, the reverse path 21 is comprised of the third outside guide surface 21a extending toward the junction point J from the reverse sheet discharge roller pair 15, and the third inside guide surface 21b extending toward the reading front roller pair 13 in parallel with the third outside guide surface 21a. Then, a third register space SP3 is also provided in the reverse path 21. As shown in FIG. 7, the third register space SP3 is formed by protruding outward the third inside guide surface 21b close to the reverse sheet discharge roller pair 15. Then, a third film member M3 is disposed along the third inside guide surface 21b. The third film member M3 is extended toward the upstream side of the reverse path 21 from the downstream side thereof as a starting point, and has the role for separating the sheet to switch back to the downstream side by backward rotation of the reverse sheet discharge roller pair 15. In addition, the third film member M3 bows by the sheet being transported from the upstream side thereof, and thereby facilitates passage of the sheet.

By providing the third register space SP3 in the reverse path 21, it is effective in the case where the register loop amount is large and the register amount is not resolved in the second register space SP2.

In the reverse path 21, the curved portion of the second inside guide surface 9b joining the paper feed path 8 is made wider than the upstream side and exit side thereof, and it is thereby possible to perform transport of the sheet smoothly. Further, the distance between the third outside guide surface 21a and the second inside guide surface 21b is formed to be narrower gradually toward the junction point J with the paper feed path 8, and it is thereby possible to suppress fluctuations in the transport direction of the sheet guided by the second film member M2.

Figure 8:
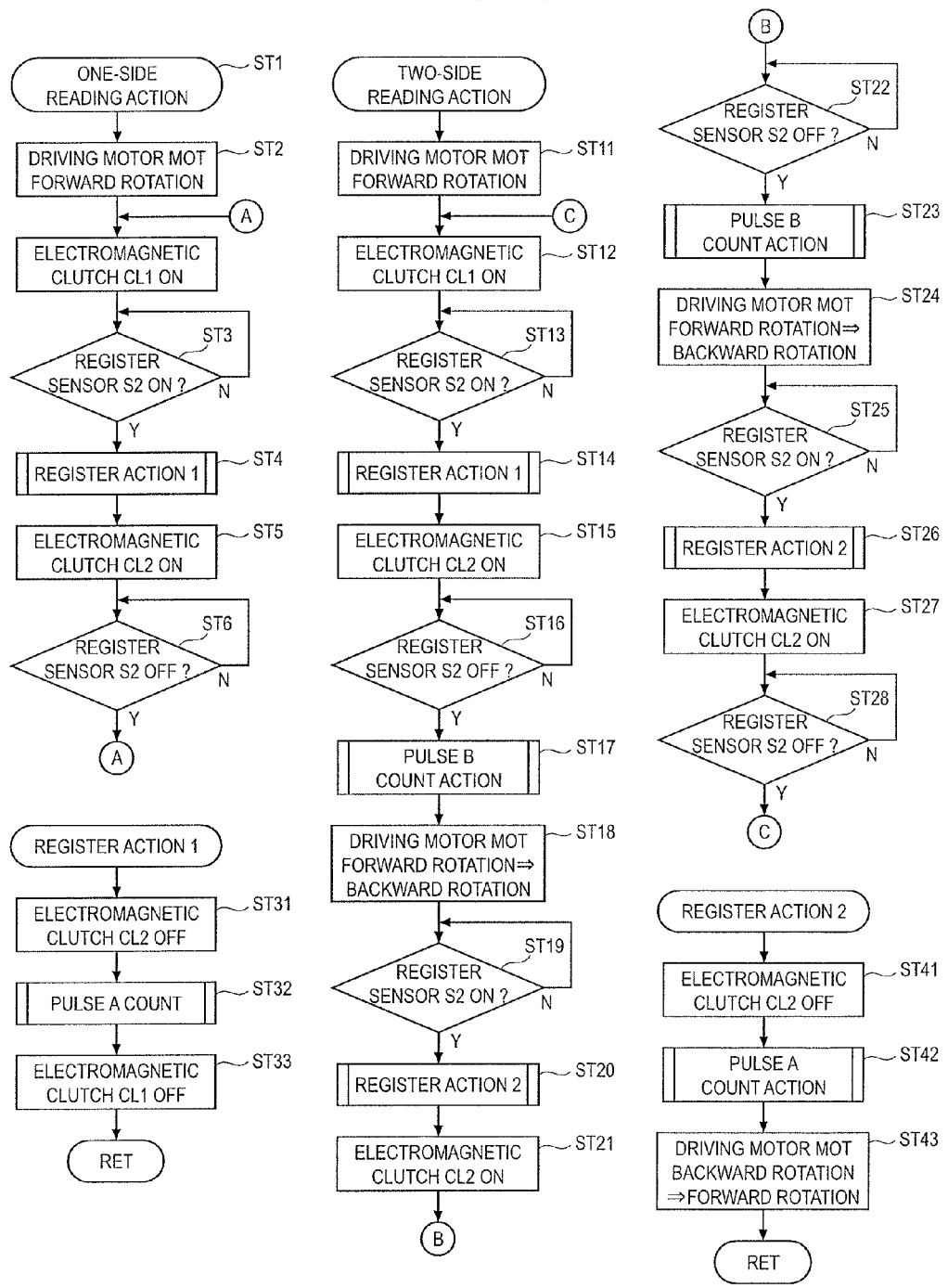
FIG. 8 is a driving control flow diagram of the sheet transport apparatus.

Sheet transport driving will specifically be described next based on FIG. 8 with reference to FIGS. 2 to 7. First, in one-side reading action for reading one side (frontside) of a sheet P, when the empty sensor S1 is in an ON state, i.e. it is detected that the sheet P is mounted on the paper feed tray 3, the driving motor MOT is driven to rotate forward, and concurrently, the first electromagnetic clutch CL1 is turned ON (ST1 to ST2). By this means, the pick-up roller 11 and paper feed roller 12 are driven to rotate, and the sheet P on the paper feed tray 3 is fed (see FIG. 3). Then, when the register sensor S2 detects the front end of the sheet P, register action 1 is executed (ST3, ST4).

In the register action 1, the electromagnetic clutch CL2 is turned OFF to halt rotation of the reading front roller pair 13. The count of the number of driving pulses of the driving motor MOT is concurrently started, and when the number of pulses reaches the predetermined number of pulses (pulse A), the electromagnetic clutch CL1 is turned OFF (ST32 to ST33). By this means, the pick-up roller 11 and paper feed roller 12 are once halted. At this point, the front end of the sheet P is struck by the nip portion n1 of the reading front roller pair 13, the sheet becomes bow-deformed, a register loop is thereby formed to align the front end, and skew is corrected. In other words, the above-mentioned predetermined number of pulses (pulse A) is the number of driving pulses of the driving motor MOT corresponding to the distance obtained by adding the distance from the detection position of the register sensor S2 to the nip portion n1 of the reading front roller pair 13 to the distance to form a desired register loop. In this Embodiment, the distance to form a register loop is set at about 5 mm, and driving is performed so as to further feed by 5 mm after the front end of the sheet strikes the nip portion n1 of the reading front roller pair 13 (see FIG. 4).

After the register action 1, with the front end of the sheet P struck by the nip portion n1 of the reading front roller pair 13, the electromagnetic clutch CL2 is turned ON (ST5). By this means, the reading front roller pair 13 is driven to rotate, and the sheet P is transported toward the platen 5. The sheet P transported to the platen 5 by the reading front roller pair 13 travels along the top surface of the platen 5, and is discharged to the sheet discharge tray 4 by the reading rear roller pair 14 and reverse sheet discharge roller pair 15. In the process during which the sheet P is transported along the top surface of the platen 5, the sheet P undergoes reading processing. Further, after the electromagnetic clutch CL2 is turned ON, when the register sensor S2 detects the rear end of the sheet P which is transported by the reading front roller pair 13, reading rear roller pair 14 and reverse sheet discharge roller pair 15, the electromagnetic clutch CL1 is turned ON again, and feed of a next sheet is started (ST6, ST7).

In two-side reading action for reading two sides (frontside and backside) of a sheet P, when the empty sensor S1 detects that the sheet P is mounted on the paper feed tray 3, the driving motor MOT is driven to rotate forward, and the first electromagnetic clutch CL1 is turned ON (ST11 to ST12). By this means, the pick-up roller 11 and paper feed roller 12 are driven to rotate, and the sheet P is fed. Then, as in the one-side reading action, at the time the register sensor S2 detects the front end of the sheet P, the register action 1 is executed and the front end of the sheet P is aligned (ST13, ST14).

When the front end of the sheet P is aligned by the register action 1, the electromagnetic clutch CL2 is turned ON, and the sheet P is transported onto the platen 5 by the reading front roller pair 13 to pass through (ST15). In the process during which the sheet P passes through the platen 5, the frontside of the sheet P is read. The sheet P having passed through the platen 5 is transported to the sheet discharge tray 4 side by the reading rear roller pair 14 and reverse sheet discharge roller pair 15. Then, from the time the register sensor S2 detects the rear end of the sheet P, the number of driving pulses of the driving motor MOT is counted, and when the count value reaches the predetermined number of pulses (pulse B), the driving motor MOT is switched from forward-rotation driving to backward-rotation driving (ST16 to ST18). By this means, the reverse sheet discharge roller pair 15 is switched from forward rotation to backward rotation, and the sheet P is switched back by the reverse path 21. The above-mentioned predetermined number of pulses (pulse B) is the number of driving pulses of the driving motor MOT corresponding to the distance from the register sensor S2 to a predetermined position between the third film member M3 and the reverse sheet discharge roller pair 15.

The sheet P that is switched back by the reverse sheet discharge roller pair 15 is transported toward the reading front roller pair 13 along the reverse path 21. Then, when the front end of the sheet P is detected by the register sensor S2 again, register action 2 described below is executed (ST19 to ST20).

In the register action 2, the electromagnetic clutch CL2 is turned OFF to halt rotation of the reading front roller pair (ST41). Concurrently, the count of the number of driving pulses of the driving motor MOT is started, and the driving motor MOT is driven to rotate backward until the number of pulses reaches the predetermined number of pulses (pulse A) (ST42). By this means, the front end of the sheet P is struck by the nip portion n1 of the reading front roller pair 13, a register loop is formed in the second register space SP2, and the front end of the sheet P is thereby aligned (see FIGS. 5 and 6). When the number of pulses of the driving motor MOT reaches the predetermined number of pulses (pulse A), the driving motor MOT is switched from backward-rotation driving to forward-rotation driving (ST43).

When the register action 2 is executed, the electromagnetic clutch CL2 is turned ON (ST21). By this means, the reading front roller pair 13 is driven to rotate forward, the sheet P is transported onto the platen 5 while being reversed, and the backside of the sheet P is read. Subsequently, when the register sensor S2 detects the rear end of the sheet P with the backside read and the sheet P is transported by the predetermined number of pulses (pulse B), the driving motor MOT is switched from forward rotation to backward rotation (ST22 to ST24). Subsequently, the reverse sheet discharge roller pair 15 is switched from forward rotation to backward rotation. Then, by the rotation direction of the reverse sheet discharge roller pair 15 being switched, the sheet P is switched back again on the reverse path 21, and is transported toward the reading front roller pair 13 along the reverse path 21 (see FIG. 7). Then, when the register sensor S2 detects the front end of the sheet P, the register action 2 is executed again (ST25 to ST26).

After executing the register action 2, the electromagnetic clutch CL2 is turned ON (ST27). By this means, the reading front roller pair 13 is driven to rotate, and the sheet P is reversed and transported to the platen 5. Then, after passing through the platen 5, the sheet P is transported to the sheet discharge tray 4 by the reading front roller pair 13, reading rear roller pair 14 and reverse sheet discharge roller pair 15. In addition, the action of ST25 to ST27 is action for collating the page of the sheet P stored in the sheet discharge tray 4. Therefore, in the action, reading processing is not performed on the sheet P passing through the platen 5. Then, when the register sensor S2 detects the rear end of the sheet P which is reversed to collate the page, the electromagnetic clutch CL1 is turned ON again, and feed of a next sheet P is started (ST28, ST12).

In addition, in this Embodiment, the first to third register spaces are provided, but depending on sheets, it is possible to sufficiently collect skew of the sheet by the second register SP2 even by the configuration with the third register space SP3 of the reverse path 21 omitted.

As described above, in this Embodiment, the register spaces in performing sheet frontside reading transport and sheet backside reading transport are respectively provided in the upstream vicinity of the reading section, and it is thereby possible to implement skew correction of the sheet immediately before the reading section. By this means, it is made possible to further improve accuracy of reading processing of the sheet. Further, since the sheet is guided to respective register spaces by film members, it is possible to guide the sheet smoothly, while enabling a register loop of the sheet to be generated smoothly in each register space.

Furthermore, the first register space and second register space are formed by the outside guide surfaces, and the first guide member and second guide member bow-deformable corresponding to transport of the sheet, and it is thereby possible to form the correct register loop along each of the register spaces without applying any excessive force to the sheet.

Moreover, the second transport path is provided with the second register space and the third register space on the upstream side of the second register space, the sheet is thereby capable of forming the register loop in two portions, and it is possible to correct skew of the sheet finer.

This application claims priority from Japanese Patent Application No. 2011-082552 filed on Apr. 4, 2011.

The invention claimed is:

1. A sheet transport apparatus that transports a sheet to a reading section for reading the sheet, comprising:
   a reading front roller pair, disposed in a curved upstream vicinity of the reading section, coming into contact with a front end of the sheet to form a register loop in the sheet;
   a first transport path extending while being curved toward the reading front roller pair;
   a second transport path extending while being curved toward the reading front roller pair and joining the first transport path a predetermined position on an upstream side of the reading front roller pair;
   a first register space in which a register loop is formed in a sheet guided along the first transport path; and
   a second register space in which a register loop is formed in a sheet guided along the second transport path,
   wherein the first register space is provided on the upstream side of the predetermined position in which the first transport path joins the second transport path, and
   the second register space is provided between the predetermined position and the reading front roller pair on a downstream side of the predetermined position.

2. The sheet transport apparatus according to claim 1, wherein the reading front roller pair is disposed in a middle of a curved path extending to the reading section.

3. A sheet transport apparatus that transports a sheet to a reading section for reading the sheet, comprising:
   a reading front roller pair, disposed in an upstream vicinity of the reading section, coming into contact with a front end of the sheet to form a register loop in the sheet;
   a first transport path extending while being curved toward the reading front roller pair;
   a second transport path extending while being curved toward the reading front roller pair and joining the first transport path at a predetermined position on an upstream side of the reading front roller pair;
   a first register space in which a register loop is formed in a sheet guided along the first transport path; and
   a second register space in which a register loop is formed in a sheet guided along the second transport path,
   wherein the first register space is provided on the upstream side of the predetermined position in which the first transport path joins the second transport path,
   the second register space is provided on a downstream side of the predetermined position,
   the first transport path has a curved outside guide surface and an inside guide surface,
   the second transport path has another outside guide surface,
   the first register space is formed by the outside guide surface of the first transport path positioned on the upstream side of the predetermined position in which the first transport path joins the second transport path, and a first guide member protruding to an inside of the first transport path from the outside guide surface, and the second register space is formed by the outside guide surface of the first transport path positioned on the downstream side of the predetermined position in which the first transport path joins the second transport path, and a second guide member extending toward the reading front roller pair up to the predetermined position and forming the inside guide surface and the another outside guide surface.

4. The sheet transport apparatus according to claim 3, wherein a front end of the first guide member extends toward the outside guide surface on a vicinity of the predetermined position in which the first transport path joins the second transport path, and a front end of the second guide member extends toward the outside guide surface on a vicinity of the reading front roller pair.

5. The sheet transport apparatus according to claim 3, wherein the reading front roller pair comprises a driven roller with a rotation surface made of a low-friction member disposed on an outside guide surface side of the first transport path, and a driving roller with a rotation surface made of a high-friction member in press-contact with the driven roller.

6. The sheet transport apparatus according to claim 3, wherein the first transport path and the second transport path reverse the frontside/backside of the sheet to guide to the reading front roller pair.

7. The sheet transport apparatus according to claim 3, wherein the first guide member is formed of a soft film member easy to bow-deform, and the second guide member is formed of a rigid film member having a higher degree of hardness than the first guide member.

8. The sheet transport apparatus according to claim 3, wherein the second transport path is provided with a third register space on the upstream side of the predetermined position in which the first transport path joins, and forms the register loop of the sheet guided along the second transport path in two portions at the second register space and the third register space.

9. A sheet transport apparatus which reverses the frontside/backside of a sheet after transporting the sheet to a reading section for reading the sheet, and transports the sheet again to the reading section, comprising:

a paper feed tray to mount an original;

a paper feed path that guides the original from the paper feed tray to a platen to read the original;

a reverse path that switches back the original having passed through the platen to guide to the paper feed path;

a register roller pair, disposed downstream of a predetermined position where the paper feed path and the reverse path join to each other, forming a register loop in the original by striking a front end of the original;

a first film member, disposed upstream of the predetermined position in a curved portion of the paper feed path, protruding to an inside of the paper feed path toward a downstream side; and a second film member, extending to the predetermined position, forming a guide between the paper feed path and the reverse path, wherein a paper feed curved portion and a switch back curved portion curved toward a register roller pair side are formed respectively in the paper feed path and the reverse path, a first loop space to form a register loop of the original from the paper feed path is provided on an upstream side of the predetermined position in the curved portion of the paper feed path, a second loop space to form a register loop of the original from the reverse path is provided on the downstream side of the predetermined position, the first film member forms the first loop space between an extension in a downstream direction of the first film member and an outside guide member of the curved portion of the paper feed path, and the second film member forms the second loop space between an extension in the downstream direction of the second film member and the outside guide member.

10. The sheet transport apparatus according to claim 9, wherein the register roller pair comprises a driven roller with an outer surface made of a low-friction member disposed on an outside guide side, and a driving roller with an outer surface made of a high-friction member in press-contact with the driven roller, the first film member is provided so that the extension thereof crosses a vicinity portion of the predetermined position in the outside guide side, and the second film member is provided so that the extension thereof crosses a vicinity portion of the register roller pair in the outside guide side.

11. The sheet transport apparatus according to claim 9, wherein a third loop space is provided in the reverse path, and the original from the reverse path forms the register loop in each of the second loop space and the third loop space.

\* \* \* \* \*